PROCESS FOR ERASING RECORD DISKS TO REMOVE SOUND TRACKS AND BACKGROUND NOISES

Filed March 24, 1954

INVENTOR.
HENRY A. SHERWOOD
BY
H. G. Manning
ATTORNEY

United States Patent Office 2,822,580

Patented Feb. 11, 1958

2,822,580

PROCESS FOR ERASING RECORD DISKS TO REMOVE SOUND TRACKS AND BACKGROUND NOISES

Henry Allan Sherwood, Tarrytown, N. Y., assignor to The Soundscriber Corporation, New Haven, Conn., a corporation of Connecticut Application March 24, 1954, Serial No. 418,407

2 Claims. (Cl. 18—48)

This invention relates to a method for reprocessing used thermoplastic phonograph record disks to restore them to reusable condition in which they will be again suitable for receiving new recordings.

The present invention constitutes an improvement over the inventions disclosed in the prior Patent No. 2,539,717 to Balmer, entitled "Reprocessing Phonograph Record Disks", dated January 30, 1951; and the Patent No. 2,589,185, entitled "Machine for Reprocessing Phonograph Record Disks," to Almquist and DeNapoli, Jr. dated March 11, 1952.

It has been found in practice that it was difficult to control the reprocessing of thermoplastic records by the use of the apparatus disclosed in these and other prior patents. This was for the reason that either the records were not heated sufficiently to remove the recorded sound tracks therefrom, or they would be heated to such an extent that the records would buckle up or get "out of round."

With some previous methods of reprocessing such record disks, attempts were made to heat only the surfaces of said disks to a so-called "plasticising" temperature, and to rely upon the stiffness of the interior of the disk to prevent the record from buckling or getting out of shape. However, it was found impossible in most cases to control such methods, as the disks would either not be softened sufficiently to erase the recorded sound tracks, or would be heated to a temperature where the entire record would lose its normal flat round condition. In any event, the results were extremely erratic and not uniform.

In other words, with all previously known methods for erasing recorded disks, if the record was exposed to sufficient temperature to completely remove the sound tracks and "ghost voices," it would be deformed to such an extent that it could not be restored to its original flat circular shape.

By means of the present invention the above and other disadvantages have been overcome.

One object of the present invention is to provide a process for reconditioning a used phonograph record disk in such a manner that the record grooves therein will be almost completely obliterated from both faces of the disk simultaneously.

The plastic material in disks of this type may for example, be a vinyl resin, such as a copolymer of vinyl chloride and vinyl acetate, which under normal temperature conditions will permanently retain a record groove which has been indented therein.

The process herein disclosed is especially adapted for the restoration of record disks of thin thermoplastic material in which grooves have been previously embossed and indented by a stylus in which the recording operation has produced deformations and "plastic memory" strains in the material without cutting the surface of the record.

This result has been accomplished by successively dipping portions of the plastic record in an inert liquid, which is maintained at a temperature sufficient to completely remove the recorded grooves and holding said dipped portions in said liquid long enough to accomplish this purpose, while at the same time employing the portion of the disk which is out of said liquid to maintain the general flat, circular shape of said disk.

With these and other objects in view, there has been illustrated on the accompanying drawing one form in which the invention may conveniently be embodied in practice.

Figure 1:
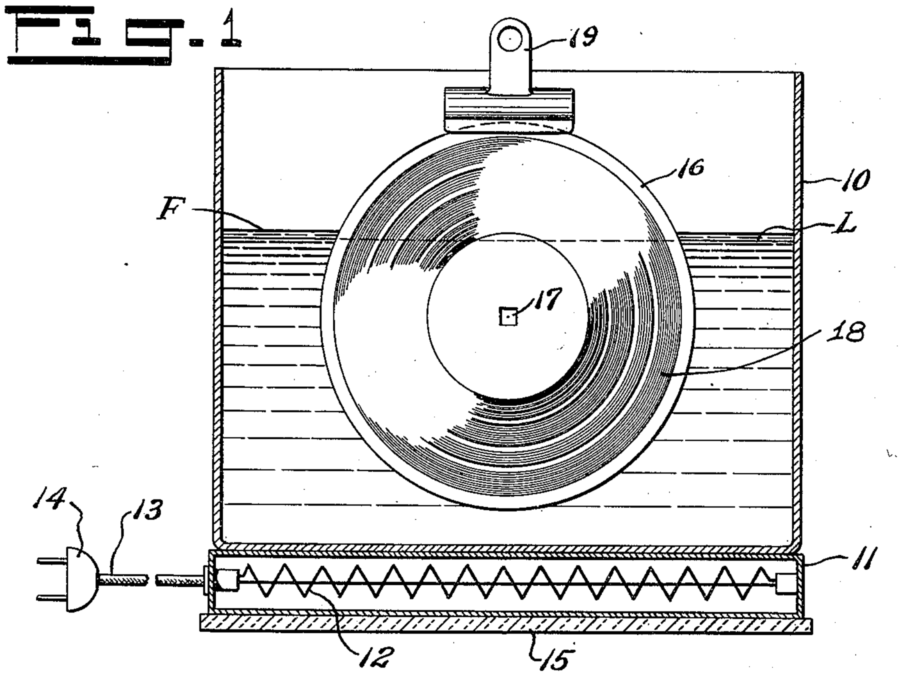
Fig. 1 is a vertical sectional view of a heated tank of liquid showing a recorded disk immersed therein with its lower portion located below the liquid level.

Referring now to the drawing, in which like reference numerals denote corresponding parts throughout the several views, the numeral 10 indicates a rectangular tank containing a heated liquid L, said tank 10 being adapted to rest upon a horizontal hollow base 11 within which is a sinuous wire heating element 12 energized by a two wire electric cable 13, receiving power from a two-prong plug 14. The base 11 is mounted upon a horizontal plate 15, as clearly shown in Fig. 1.

In one example of this process, the tank 10 will contain an inert liquid, such as ethylene glycol, heated to a temperature of at least 250 degrees Fahrenheit. A disk record 16 of thermoplastic material, of the type previously mentioned, held manually by a spring clip 19 will then be dipped into said liquid, until more than one half of it is below the level thereof, leaving a portion of the disk in the air to prevent the immersed softened portion from buckling or being deformed out of its flat circular shape. While the softened portion of the plastic disk immersed below the liquid level may become slightly ovalized, the disk will automatically become circular when it is removed from the liquid and cooled.

The disk 16 will then be withdrawn and allowed to cool in the air until it becomes stiff. It will then be rotated 180 degrees, and the other half dipped into the hot liquid in the same manner. The disk 16 will then again be withdrawn and cooled until it becomes stiff.

It will be understood that the softening of the lower half of the disk record 16 in the heated liquid L will cause said disk to stretch and wrinkle somewhat. This ovalizing or straining of the material of the record will assist in eliminating the residual intelligible sound tracks 18 from the record.

Figures 2, 3:
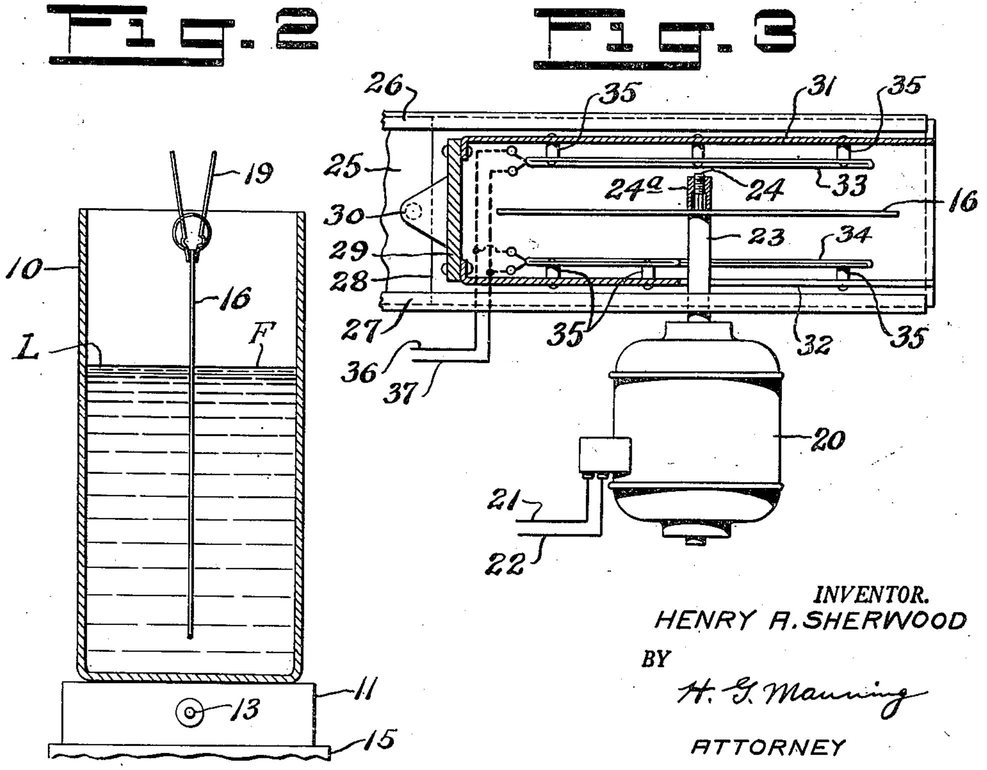
Fig. 2 is a side sectional view of the same.
Fig. 3 is a top view of a motor-driven apparatus for spinning a disk which has been reprocessed in the tank shown in Figs. 1 and 2 between the opposite heating elements of a slidable toaster to remove slight wrinkles and creases from said disk.

After the disk 16 has been treated in the liquid L by the method previously described, it will then be removed, wiped clean, allowed to cool, and taken to the final dewrinkling apparatus shown in Fig. 3, which consists of a motor 20 energized by a pair of electrical conductors 21, 22 for driving a horizontal spindle 23 having a threaded reduced end 24 upon which a nut 24*a* is screwed for clamping the disk 16 tightly upon the spindle 23.

A square central aperture 17 of the record disk will permit it to be fitted over the spindle 23 of the dewrinkling apparatus.

Provision is also made of a bottom horizontal platform 25 having a pair of parallel opposed inturned flanges 26, 27, within which is fitted a slide member 28 having an upstanding rear post 29 provided with a manipulating handle 30.

The slide member 28 is also provided with a pair of upstanding side plates 31, 32, to which a pair of heating toaster elements 33, 34 are connected by means of insulator pins 35, said heating elements being energized by a pair of electrical conductors 36, 37, and being located in parallel relationship on either side of the spinning disk 16.

One advantage of this process is that the cleaning of the disk will be facilitated by the dipping in the heated bath, and the oily film F from the previously lubricated disk which floats on the top of the bath will automatically again lubricate said disk. While a few slight residual grooves may still remain on the record after this process has been completed, the action of the stylus in recording new sound grooves will eradicate all traces of the originally recorded sound.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. The process of simultaneously erasing recorded sound tracks from both surfaces of a thermoplastic disk record, which comprises first immersing the lower half of said disk while in a vertical position in an inert liquid heated to a plasticising temperature, which will permit said lower half of said record to soften and stretch by gravity to such an extent that all sound tracks and residual "ghost" noises will be removed therefrom, then lifting said disk out of said liquid, and allowing said lower half to cool and harden, thereafter rotating said disk 180 degrees and immersing the original upper half of said disk into said liquid to eradicate sound tracks and residual "ghost" noises therefrom, thereafter removing said disk entirely from said liquid allowing it to cool and harden, and subsequently flattening out wrinkles in said disk to place it in condition for reuse.

2. The process of erasing recorded sound tracks as defined in claim 1, in which said flattening is performed by spinning said disk at high speed about its axis between a pair of heating elements.

References Cited in the file of this patent

UNITED STATES PATENTS

| | | |
|---|---|---|
| 2,578,457 | Somers | Dec. 11, 1951 |
| 2,582,491 | Larsen et al. | Jan. 15, 1952 |
| 2,663,050 | Helm | Dec. 22, 1953 |